United States Patent
Yasue (10) Patent No.: US 8,271,805 B2
(45) Date of Patent: Sep. 18, 2012

(54) METHODS AND APPARATUS FOR PROVIDING A SECURE BUFFER

(75) Inventor: Masahiro Yasue, Kanagawa (JP)

(73) Assignee: Sony Computer Entertainment Inc. (JP)

( * ) Notice: Subject to any disclaimer, the term of this patent is extended or adjusted under 35 U.S.C. 154(b) by 985 days.

(21) Appl. No.: 11/344,654

(22) Filed: Feb. 1, 2006

(65) Prior Publication Data

US 2008/0040805 A1 Feb. 14, 2008

Related U.S. Application Data

(60) Provisional application No. 60/649,996, filed on Feb. 4, 2005.

(51) Int. Cl.
*G06F 21/00* (2006.01)

(52) U.S. Cl. ........ 713/194; 713/151; 713/164; 713/165; 713/167; 713/189; 713/190; 713/193; 726/26; 380/259; 380/268; 380/37; 380/42; 380/30; 711/118; 711/119; 711/121; 711/126; 711/147

(58) Field of Classification Search .......... 713/189–194, 713/1–152, 164–167; 726/26–30, 34, 35; 380/255–43, 259, 268, 37, 42–43, 277–30; 711/118–132, 147–155
See application file for complete search history.

(56) References Cited

U.S. PATENT DOCUMENTS

| | | | |
|---|---|---|---|
| 4,454,575 A | 6/1984 | Bushaw et al. | |
| 4,573,119 A | 2/1986 | Westheimer et al. | |
| 4,987,595 A * | 1/1991 | Marino et al. | 713/164 |
| 5,548,648 A * | 8/1996 | Yorke-Smith | 713/193 |
| 5,805,706 A * | 9/1998 | Davis | 713/153 |
| 5,809,145 A | 9/1998 | Slik et al. | |
| 5,940,592 A | 8/1999 | Ioki et al. | |
| 5,977,997 A | 11/1999 | Vainsencher | |
| 5,995,623 A | 11/1999 | Kawano et al. | |
| 6,014,730 A | 1/2000 | Ohtsu | |
| 6,118,870 A | 9/2000 | Boyle et al. | |
| 6,240,516 B1 | 5/2001 | Vainsencher | |
| 6,252,961 B1 * | 6/2001 | Hogan | 380/37 |

(Continued)

FOREIGN PATENT DOCUMENTS

EP 0406187 A1 * 1/1991

OTHER PUBLICATIONS

Microsoft Dictionary; Publisher: Microsoft Press; Pub. Date: May 1, 2002.*

(Continued)

*Primary Examiner* — Taghi Arani
*Assistant Examiner* — Madhuri Herzog
(74) *Attorney, Agent, or Firm* — Lerner, David, Littenberg, Krumholz & Mentlik, LLP (57) ABSTRACT

The present invention provides a secure buffer for use in data storage and encryption processing. Blocks or packets of data are passed to a secure buffer within a processor. The processor may be one of many coprocessors, and the secure buffer may be inaccessible to some or all of the coprocessors. Data may be partially or fully encrypted and stored within the secure buffer. Encryption may occur before or after storage in the buffer, or it may take place within the buffer itself. Optionally, the encrypted data may be sent to and retrieved from a shared memory that is accessible by other coprocessors.

38 Claims, 8 Drawing Sheets

U.S. PATENT DOCUMENTS

| | | | |
|---|---|---|---|
| 6,434,699 B1* | 8/2002 | Jones et al. | 713/168 |
| 6,438,678 B1 | 8/2002 | Cashman et al. | |
| 6,460,095 B1 | 10/2002 | Ueno et al. | |
| 6,477,646 B1 | 11/2002 | Krishna et al. | |
| 7,062,769 B1* | 6/2006 | Ma et al. | 719/312 |
| 2001/0021976 A1 | 9/2001 | Shibuya et al. | |
| 2001/0032318 A1 | 10/2001 | Yip et al. | |
| 2002/0062445 A1 | 5/2002 | Owada et al. | |
| 2002/0146128 A1 | 10/2002 | Mauro et al. | |
| 2002/0157016 A1 | 10/2002 | Russell et al. | |
| 2003/0037247 A1 | 2/2003 | Obara et al. | |
| 2003/0097575 A1 | 5/2003 | Owada et al. | |
| 2003/0154295 A1* | 8/2003 | Mangold | 709/229 |
| 2003/0159140 A1 | 8/2003 | Candelore | |
| 2004/0003321 A1* | 1/2004 | Glew et al. | 714/27 |
| 2004/0108945 A1* | 6/2004 | Hori | 341/63 |
| 2005/0123139 A1* | 6/2005 | Chin | 380/265 |
| 2006/0005047 A1* | 1/2006 | Lekatsas et al. | 713/193 |
| 2011/0161650 A1* | 6/2011 | Paksoy et al. | 713/2 |

OTHER PUBLICATIONS

The Architecture of Pentium Microprocessor; Contributed by: Rajesh Kothandapani; Year: 2003.*

Parallel Processing; Author: Rajkumar Buyya; Date: Jul. 20, 2004; http://web.archive.org/web/*/http://www.cs.mu.oz.au/678/ParCom.ppt.*

CryptoCache: a secure sharable file cache for roaming users by Christian D. Jensen; Year: 2000; Publisher: ACM.*

Kun-Wah Yip et al., "Partial-Encryption Technique for Intellectual Property Protection of FPGA-Based Products," 2000 IEEE Trans. on Cons. Elec., vol. 46, No. 1, Feb. 2000.

Miles E. Smid et al., "The Data Encryption Standard: Past and Future," Proceedings of the IEEE, vol. 76, No. 5, May 1988.

James Hughes et al., "A Universal Access, Smart-Card-Based, Secure File System," Feb. 8, 2000.

* cited by examiner

METHODS AND APPARATUS FOR PROVIDING A SECURE BUFFER

CROSS-REFERENCE TO RELATED APPLICATION

This application claims the benefit of the filing date of U.S. Provisional Patent Application No. 60/649,996, entitled METHODS AND APPARATUS FOR PROVIDING A SECURE BUFFER, and filed Feb. 4, 2005, the disclosure of which is hereby incorporated herein by reference.

BACKGROUND

The present invention relates to data storage and processing, and, in particular, to methods and apparatus for encrypting, decrypting, and processing data in a secure computing environment.

Computing systems are becoming increasingly more advanced, often tying multiple coprocessors together in order to boost processing speed and enhance overall performance. Often, computing systems integrate the coprocessors in parallel (or at least in concert) to increase processing efficiency. Such advances are critical to the success of many applications, such as real-time multimedia gaming and other computation-intensive applications.

Advanced computing systems may also include encryption technology in order to provide a more secure computing environment. Data may be encrypted and then stored in a memory for later access. Various encryption schemes have been employed to achieve a measure of security, e.g., using public and private keys, as is well known in the art.

There is a tradeoff in the amount of time and resources spent on encryption versus the security of the data. For example, a data stream may provide packets which include 256 bytes of data plus a header associated with each packet. All 256 bytes of data may be encrypted in accordance with a conventional encryption scheme. However, the encryption is computationally intensive, and additional packets of data may arrive during the time it takes to perform the encryption on the first packet of data. If the encryption system is not capable of keeping pace with the data transport system, the encryption processing will impair the overall system performance.

In the past, a variety of techniques have been employed to help address this encryption problem. One scheme performs encryption only on the header, which is typically much smaller than the data in the packet. The rationale is that if the header is rendered unusable, the data associated with it will likewise be rendered unusable. Because the data of interest is itself not encrypted, anyone bypassing the encrypted header has immediate access to the data.

Another scheme performs partial encryption on the data within the packet. Here, the problems associated with full encryption may be avoided (e.g., excessive time and resource usage). Furthermore, as opposed to header encryption, because some of the data is encrypted, the overall data block is of little practical use.

Unfortunately, secure data processing is difficult to achieve in a multiprocessing environment, or in a processing environment where distinct processors have access to a shared memory. In a multiprocessor environment, raw data may be passed along common buses. This data can be readily obtained by accessing connections (e.g., pins) between components on a computer chip. It is also possible that critical data may be obtained by one coprocessor even though it is meant for processing by another coprocessor. This scenario is even more alarming in distributed computing environments where coprocessors (or distinct processors) may be physically separated from one another and/or under the control of different entities, which may become common in advanced gaming environments, to name one such application.

Therefore, there is a need in the art for new methods and apparatus for achieving data security while avoiding excessive encryption processing time and wasting valuable computing resources.

SUMMARY OF THE INVENTION

In accordance with an embodiment of the present invention, a method of processing data is provided. The method comprises first receiving data in a processor. Encryption is performed on the data to generate encrypted data. The encrypted data is then stored in a secure buffer within the processor. The encryption is preferably partial data encryption. In this case, the method may include storing encryption information pertaining to the partial data encryption in the secure buffer. The encryption information may be stored in a non-volatile memory within the secure buffer.

In accordance with another embodiment of the present invention, a method of processing data is provided wherein data is received in a processor and stored in a secure buffer within the processor. Encryption is performed on the data to generate encrypted data. The method preferably further comprises transferring the encrypted data to an external memory, which may be accessible to a plurality of processors.

In accordance with a further embodiment of the present invention, a method of processing data is provided. The method comprises retrieving encrypted data from an external memory, storing the encrypted data in a secure buffer within a processor, and performing decryption on the encrypted data to generate decrypted data. The decrypted data may be transferred from the secure buffer to a device external to the processor, or to another device within the processor. Preferably, the encrypted data is partially encrypted data.

In accordance with a further embodiment of the present invention, a processing apparatus is provided. The processing apparatus includes a local memory, a plurality of registers, at least one floating point unit, at least one integer unit, a bus interface, an encryption processor and a secure buffer. The local memory is for storing data. The plurality of registers is associated with the local memory. The floating point unit is linked with the plurality of registers, and is operable to perform floating point operations on the data. The integer unit is also linked with the plurality of registers, and is operable to perform integer operations on the data. The bus interface is operatively connected to the local memory. The encryption processor is for performing encryption and decryption processing on selected data. The secure buffer is for storing the selected data. The secure buffer is logically connected to the encryption processor and the bus interface.

In accordance with another embodiment of the present invention, a method of processing data in a parallel processing system is provided. The method comprises providing a plurality of processors, at least some of the plurality of processors including a secure buffer; receiving data in a selected one of the plurality of processors; performing encryption on the data to generate encrypted data; and storing the encrypted data in the secure buffer of the selected processor. Preferably, the encryption is partial data encryption. In this case, the method may further include storing encryption information pertaining to the partial data encryption in the secure buffer of the selected processor.

In accordance with yet another embodiment of the present invention, a method of processing data in a parallel processing system is provided. The method comprises providing a plurality of processors, at least some of the plurality of processors including a secure buffer; receiving data in a selected one of the plurality of processors; storing the data in the secure buffer of the selected processor; and performing encryption on the data to generate encrypted data. The method preferably includes transferring the encrypted data to an external memory. In this case, prior to transferring the encrypted data, the method may include placing the encrypted data onto a common data bus shared by at least some of the plurality of processors.

In accordance with another embodiment of the present invention, a processing apparatus having a processing unit, a plurality of sub-processing units, and a direct memory access controller, is provided. At least a selected one of the plurality of sub-processing units includes a secure buffer for storing encrypted data. The direct memory access controller is connected to the processing unit and the plurality of sub-processing units. The direct memory access controller is operable to transfer the encrypted data stored in the secure buffer of the selected sub-processing unit to an external memory. The selected sub-processing unit preferably includes an encryption processor that is operable to generate the encrypted data and to generate decrypted data from the encrypted data. The encrypted data is preferably partially encrypted data.

DETAILED DESCRIPTION

In describing the preferred embodiments of the invention illustrated in the drawings, specific terminology will be used for the sake of clarity. However, the invention is not intended to be limited to the specific terms so selected, and it is to be understood that each specific term includes all technical equivalents that operate in a similar manner to accomplish a similar purpose.

Figure 1:
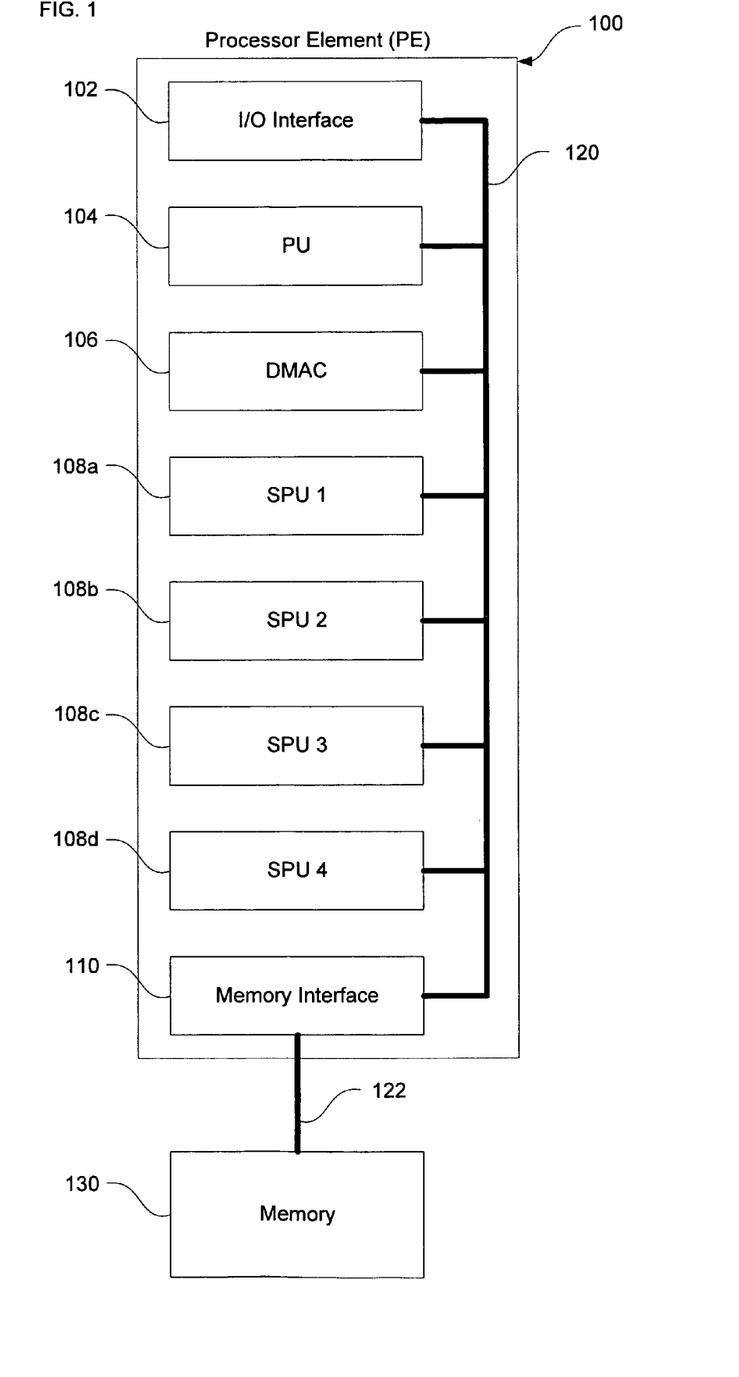
FIG. 1 is a diagram illustrating an exemplary structure of a processing element (PE) in accordance with aspects of the present invention.

Reference is now made to FIG. 1, which is a block diagram of a basic processing module or processor element (PE) 100. As shown in this figure, PE 100 preferably comprises an I/O interface 102, a processing unit (PU) 104, a direct memory access controller (DMAC) 106, and a plurality of sub-processing units (SPUs) 108, namely SPUs 108a-108d. While four SPUs 108a-d are shown, the PE 100 may include any number of such devices. A local (or internal) PE bus 120 transmits data and applications among PU 104, the SPUs 108, I/O interface 102, DMAC 106 and a memory interface 310. Local PE bus 120 can have, e.g., a conventional architecture or can be implemented as a packet switch network. Implementation as a packet switch network, while requiring more hardware, increases available bandwidth.

PE 100 can be constructed using various methods for implementing digital logic. Typically, the components of PE 100 are constructed as integrated circuits employing a complementary metal oxide semiconductor (CMOS) on a substrate. The substrate is preferably a silicon substrate. Alternative materials for the substrate include, but are not limited to, gallium arsenide, gallium aluminum arsenide and other so-called III-B compounds employing a wide variety of dopants. Components could also be implemented using superconducting material, e.g., rapid single-flux-quantum (RSFQ) logic.

PE 100 preferably is constructed, however, as a single integrated circuit employing CMOS on a silicon substrate. PE 100 is closely associated with a memory 130 through a high bandwidth memory connection 122. The memory 130 desirably functions as the main memory for PE 100. Although the memory 130 is preferably a dynamic random access memory (DRAM), the memory 130 could be implemented using other means, e.g., as a static random access memory (SRAM), a magnetic random access memory (MRAM), an optical memory, a holographic memory, etc. The memory 130 may be located on the same chip as the PE 100 or on a different chip. DMAC 106 and memory interface 110 facilitate the transfer of data between the memory 130 and the SPUs 108 and PU 104 of the PE 100.

PU 104 can be, e.g., a standard processor capable of stand-alone processing of data and applications. In operation, the PU 104 schedules and orchestrates the processing of data and applications by the SPUs 108. The SPUs 108 preferably are single instruction, multiple data (SIMD) processors. Under the control of PU 104, the SPUs 108 may perform the processing of the data and applications in a parallel and independent manner. DMAC 106 preferably controls accesses by PU 104 and the SPUs 108 to the data and applications stored in the shared memory 130. Preferably, a number of PEs, such as PE 100, may be joined or packed together to provide enhanced processing power. The PEs may be distributed among one or more chips.

It should be understood that the above processing modules and architectures are merely exemplary, and the various aspects of the present invention may be employed with other structures, including, but not limited to multiprocessor systems of the types disclosed in U.S. Pat. No. 6,526,491, entitled "Memory Protection System and Method for Computer Architecture for Broadband Networks," issued Feb. 25, 2003, U.S. Pat. No. 6,809,734, entitled "Resource Dedication System and Method for a Computer Architecture for Broadband Networks, issued Oct. 26, 2004, U.S. Pat. No. 6,826, 662, entitled "System and Method for Data Synchronization for a Computer Architecture for Broadband Networks," issued Nov. 30, 2004, and U.S. application Ser. No. 09/816, 004, entitled "Computer Architecture and Software Cells for Broadband Networks," filed on Mar. 22, 2001, the entire disclosures of which are hereby expressly incorporated by reference herein.

Figure 2:
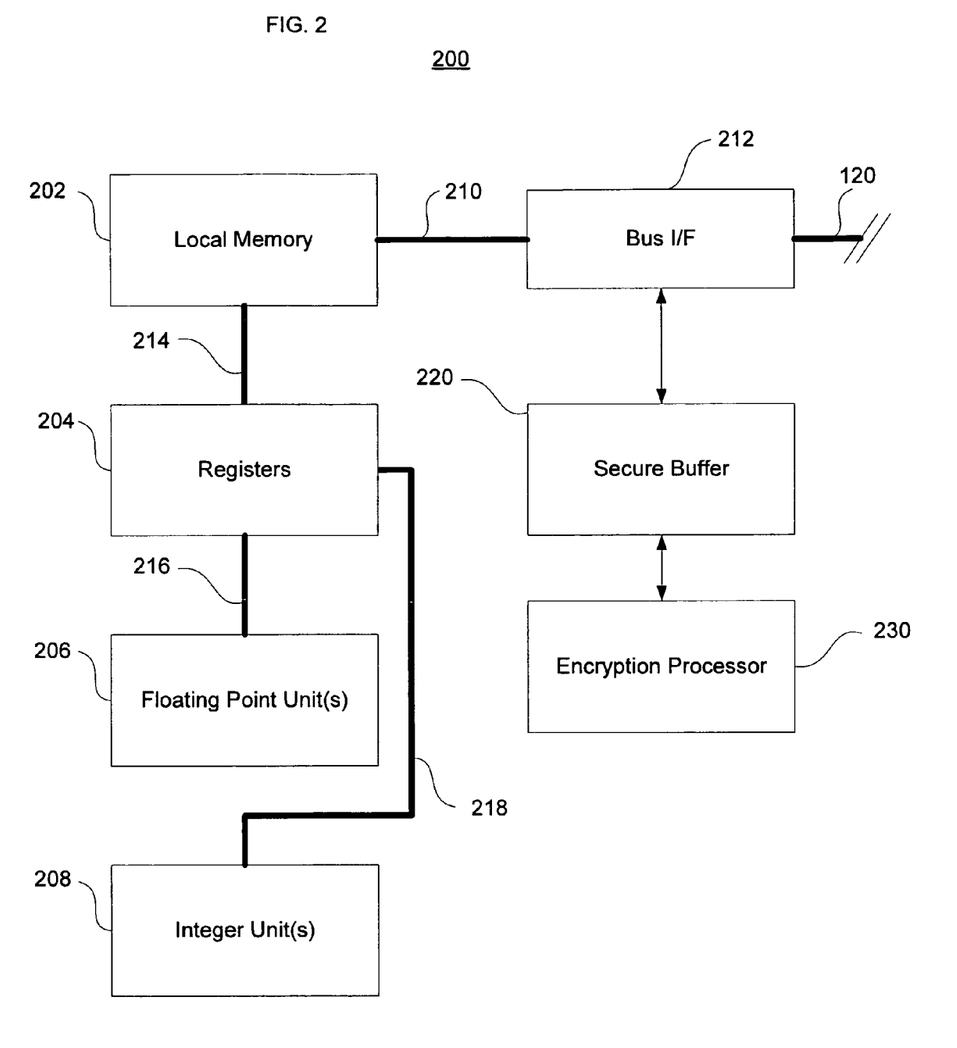
FIG. 2 is a diagram illustrating an exemplary structure of a sub-processing unit (SPU) in accordance with aspects of the present invention.

FIG. 2 illustrates the structure and function of an SPU 200. The SPU 200 includes a local memory 202, registers 204, one or more floating point units 206 and one or more integer units 208. Depending upon the processing power required, a greater or lesser number of floating point units 206 and integer units 208 may be employed. In a preferred embodiment, the local memory 202 contains at least 128 kilobytes of storage, and the capacity of the registers 204 is 128×128 bits. The floating point units 206 preferably operate at a speed of at least 32 billion floating point operations per second (32 GFLOPS), and the integer units 208 preferably operate at a speed of at least 32 billion operations per second (32 GOPS).

The local memory 202 is preferably not a cache memory. Cache coherency support for the SPU 200 is unnecessary. Instead, the local memory 202 is preferably constructed as an SRAM. A PU 104 may require cache coherency support for direct memory access initiated by the PU 104. Cache coherency support is not required, however, for direct memory access initiated by the SPU 200 or for accesses to and from external devices.

SPU 200 further includes bus 210 for transmitting applications and data to and from the SPU 200 through a bus interface (Bus I/F) 212. In a preferred embodiment, the bus 210 is 1,024 bits wide. The SPU 200 further includes internal busses 214, 216 and 218. In a preferred embodiment, the bus 214 has a width of 256 bits and provides communication between the local memory 202 and the registers 204. The busses 216 and 218 provide communications between, respectively, the registers 204 and the floating point units 206, and the registers 204 and the integer units 208. In a preferred embodiment, the width of the busses 216 and 218 from the registers 204 to the floating point or integer units is 384 bits, and the width of the busses 216 and 218 from the floating point or integer units to the registers 204 is 128 bits. The larger width of the busses from the registers 204 to the floating point units 206 and the integer units 208 accommodates the larger data flow from the registers 204 during processing.

The SPU 200 preferably further includes a secure buffer 220 and an encryption processor 230. The secure buffer 220 and/or the encryption processor 230 are desirably logically connected to one or more of the other components of the SPU 200. The secure buffer 220 stores data within the SPU 200 so that it is not accessible by other SPUs 200. The encryption processor 230 is desirably capable of performing data encryption and decryption locally within the SPU 200. While the secure buffer 220 and the encryption processor 230 are shown as part of the SPU 200, they may alternatively be distinct components residing in the PU 104 and/or the PE 100 directly, or may physically or logically reside elsewhere in the system. For example, the secure buffer 220 may be positioned in the system so that any data going to the memory 130 is routed through the secure buffer 220 and is encrypted. In this case, the secure buffer 220 and/or the encryption processor 230 may connect to the SPU 200 through dedicated or exclusive busses.

Figure 3:
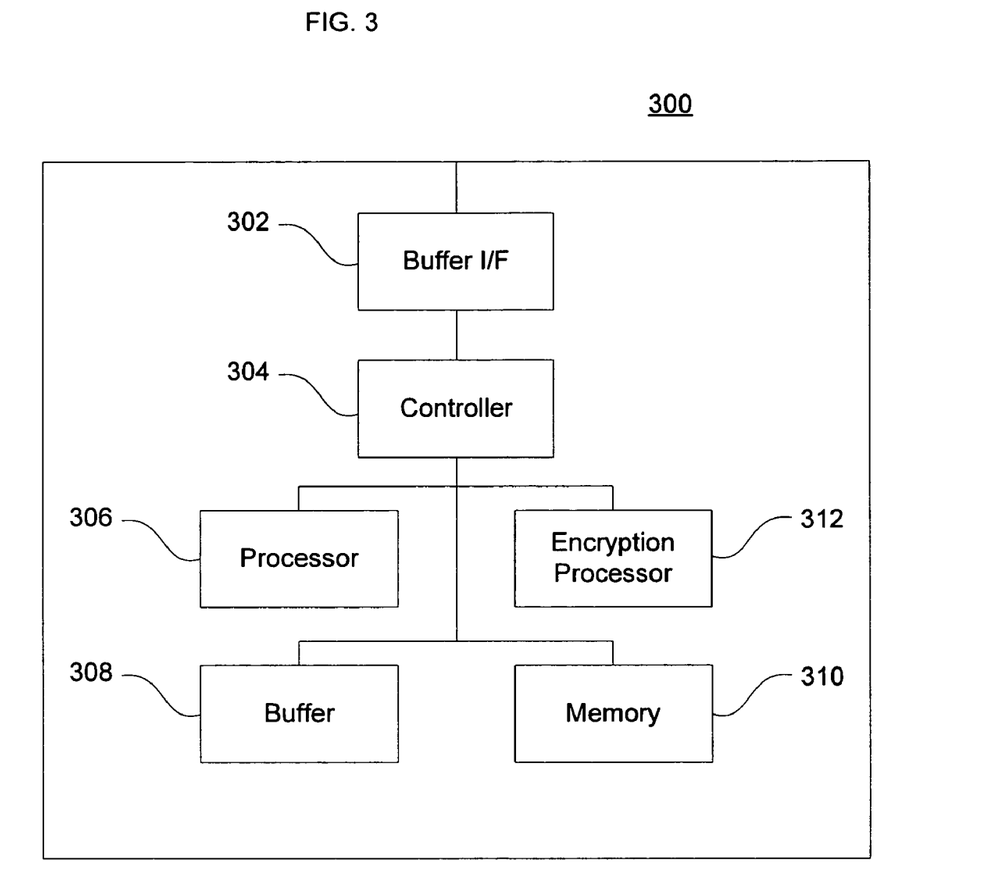
FIG. 3 is a diagram illustrating a secure buffer in accordance with aspects of the present invention.

FIG. 3 illustrates a preferred embodiment of a secure buffer 300 in more detail. A buffer interface 302 preferably sends and receives data and operates as the go-between with the bus interface 212. Controller 304 is desirably responsible for handling read and write operations in the secure buffer 300. The controller 304 may interface with a processor 306, which may regulate the overall operation of the secure buffer 300. Optionally, only one of the controller 304 or the processor 306 may be employed to manage the secure buffer 300. A buffer or short-term memory 308 desirably provides temporary storage of data before and/or after encryption or decryption. Memory 310, which is preferably a non-volatile memory, is desirably provided for storing program information and/or encryption information, as will be explained below.

The secure buffer 300 may also include an encryption processor 312. The encryption processor 312 may take the place of or augment the operation of the encryption processor 230. The secure buffer 300 is desirably isolated within the SPU 200 and is preferably inaccessible to other SPUs 200. The isolation may be, for instance, physical and/or logical isolation. Alternatively, the secure buffer 300 may be statically or dynamically shared among some or all of the SPUs 200 within a single PE 100, or even among multiple PEs 100.

Figure 4:
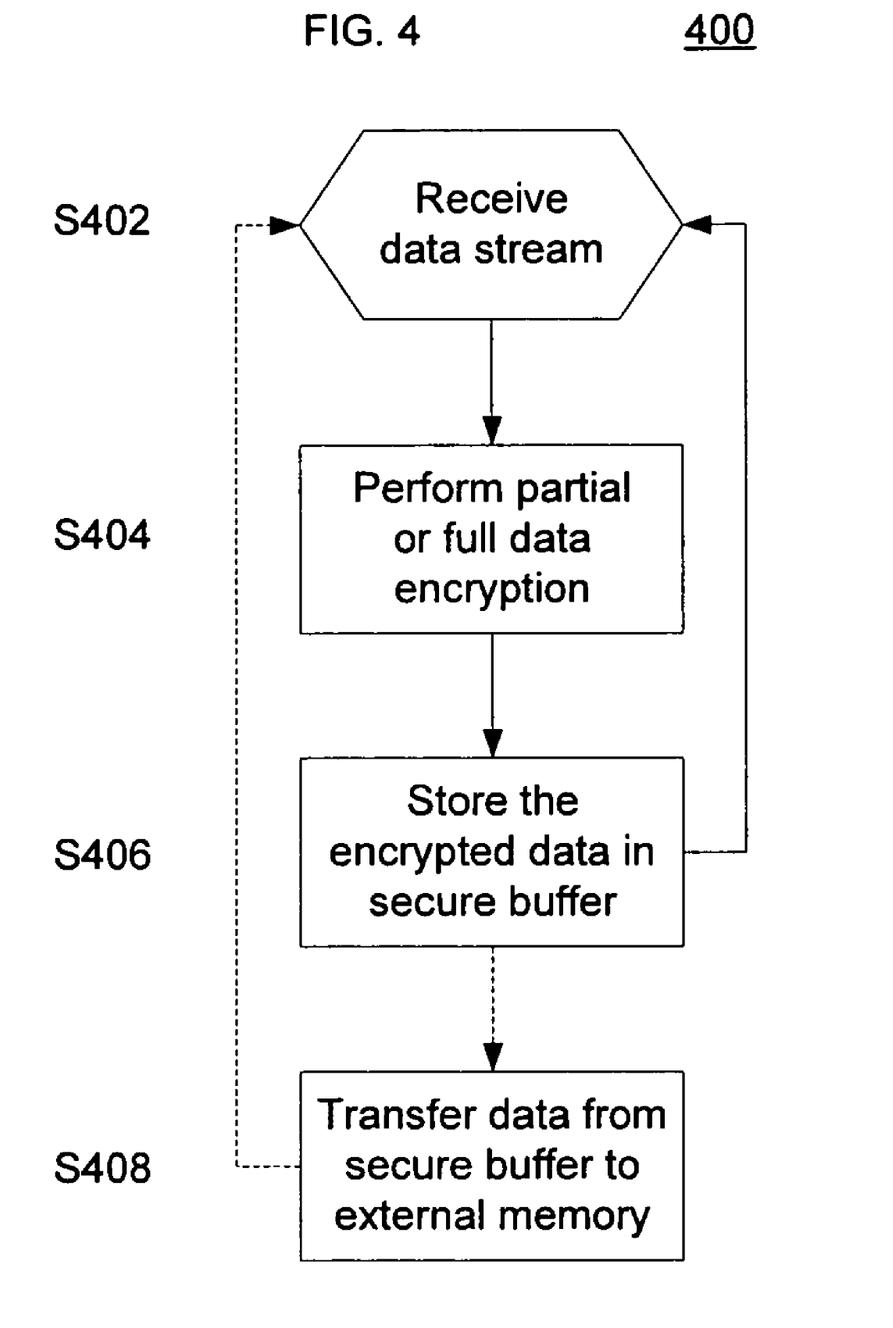
FIG. 4 is a flow diagram illustrating a method of employing a secure buffer in accordance with aspects of the present invention.

FIG. 4 illustrates a flow diagram 400 that shows a preferred method 400 of handling data using the secure buffer 300. At step S402, the SPU 200 may obtain data to be encrypted. The data may come from a data stream along the PE bus 120 via the bus interface 212. Alternatively the data to be processed may be provided internally as a data block from within the SPU 200, for example, by the local memory 202, the registers 204, the floating point unit 206 and/or from the integer unit 208. At step S404, encryption is performed on the data by, e.g., the encryption processor 230. Desirably, encryption is performed only on the data itself and not on header information. More preferably, the encryption is partial data encryption. The encryption may be performed under the guidance or control of the secure buffer 300. Next, the encrypted data is stored in the buffer 308 at step S406. At this point, the process may return to step S402 or the encrypted data may optionally be transferred to an external memory, e.g., the memory 130, in step S408. Upon completion of the data transfer, the process returns to step S402.

Figure 5:
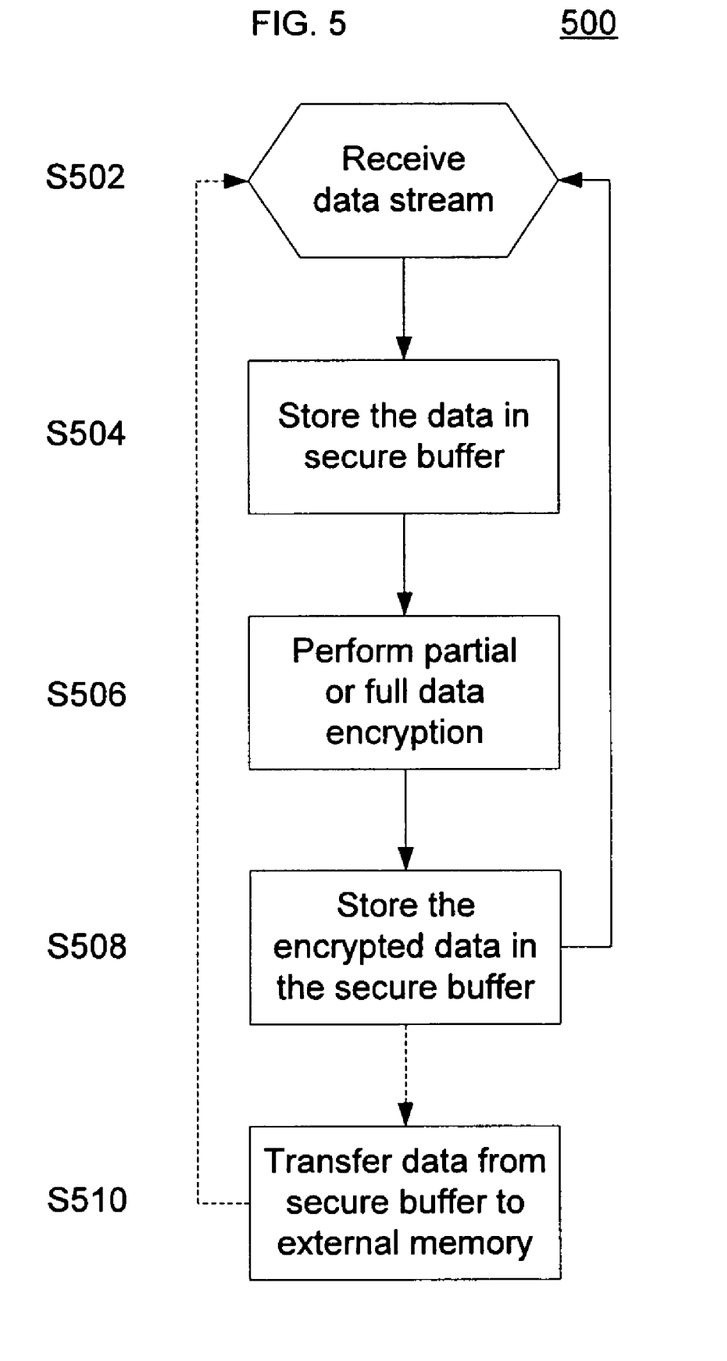
FIG. 5 is a flow diagram illustrating another method of employing a secure buffer in accordance with aspects of the present invention.

FIG. 5 illustrates a flow diagram 500 that shows another preferred method 500 of handling data using the secure buffer 300. At step S502, the SPU 200 may obtain data to be encrypted. As in the method 400, the data may come from the PE bus 120 via the bus interface 212. Alternatively the data to be processed may come from within the SPU 200 from, for example, the local memory 202, the registers 204, the floating point unit 206 and/or from the integer unit 208. At step S504, the data is stored in the buffer 308. Next, in step S506, the data is encrypted by, e.g., the encryption processor 312. Desirably, encryption is performed only on the data itself and not on header information. More preferably, the encryption is partial data encryption. The encryption may be performed under the guidance or control of the controller 304 and/or the processor 306. Next, the encrypted data is returned to the buffer 308 for storage at step S508. At this point, the process may return to step S502 or the encrypted data may optionally be transferred to an external memory in step S510. Upon completion of the data transfer, the process returns to step S502.

Figure 6:
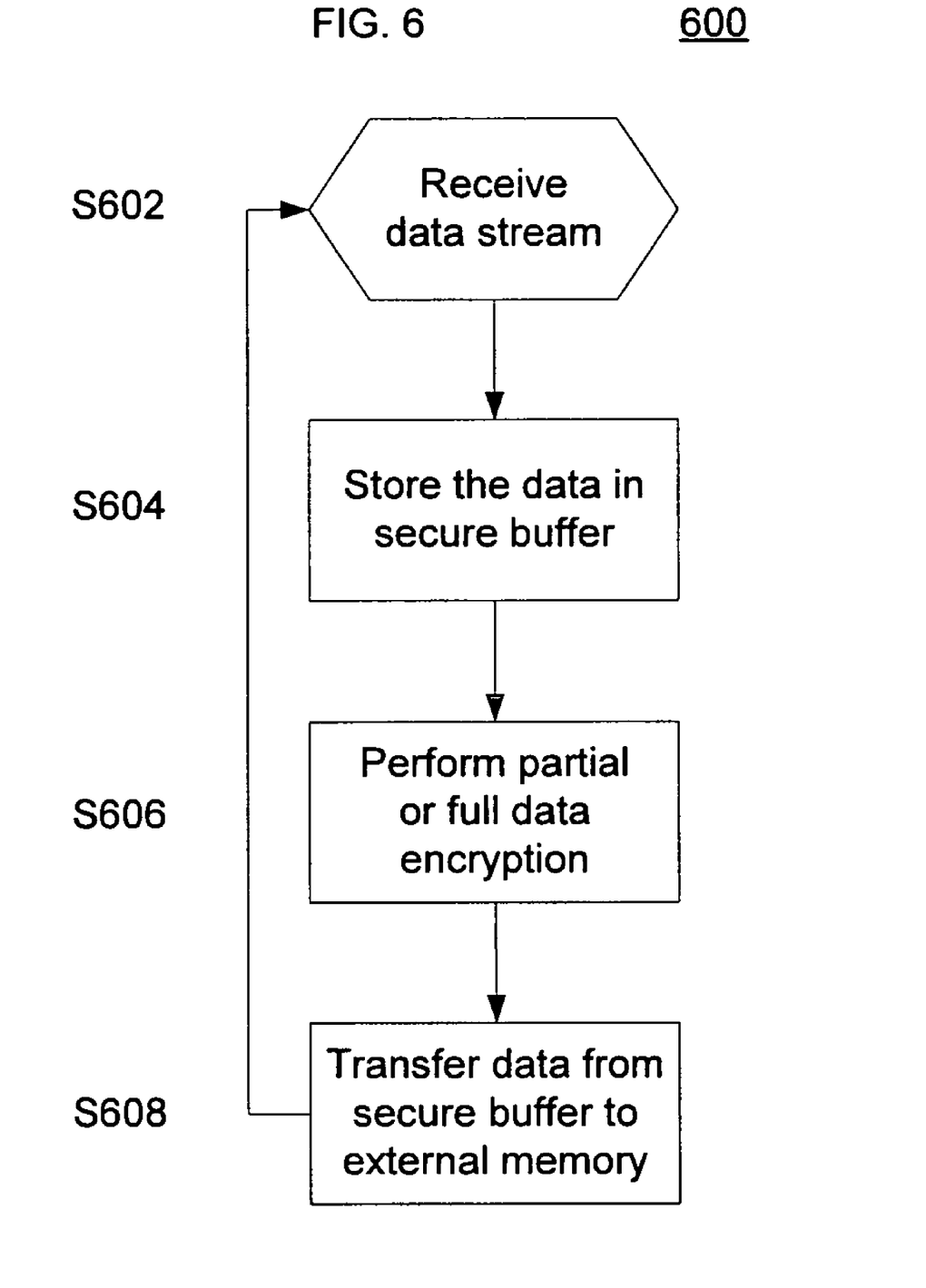
FIG. 6 is a flow diagram illustrating a further method of employing a secure buffer in accordance with aspects of the present invention.

FIG. 6 illustrates a flow diagram 600 that shows yet another preferred method 600 of handling data using the secure buffer 300. At step S602, the SPU 200 may obtain data to be encrypted. As in the methods 400 and 500, the data may come from the PE bus 120 via the bus interface 212. Alternatively the data to be processed may come from within the SPU 200. At step S604, the data is stored in the buffer 308 within the secure buffer 300. Next, in step S606, data encryption is performed, by, e.g., the encryption processor 312. Desirably, encryption is performed only on the data itself and not on header information. More preferably, the encryption is partial data encryption. The encryption may be performed under the guidance or control of the controller 304 and/or the processor 306. Next, the encrypted data is transferred to an external memory in step S608. Upon completion of the data transfer, the process returns to step S602.

Thus, as seen in the above processes, encryption can be performed before or after storage within the secure buffer 300. The encryption can be performed within the secure buffer 300 by the encryption processor 312, or externally by the encryption processor 230. Any type of encryption algorithm may be utilized with encryption and/or decryption in accordance with the present invention. By way of example only, one or more translation tables and/or data repositioning may be used. Also, key-based encryption algorithms may be used along or in combination with other methods. Key-based algorithms include symmetric or secret-key, as well as asymmetric or public-key algorithms. Preferred asymmetric/public-key algorithms include PGP and Rivest-Shamir-Adleman (RSA). Preferred symmetric/secret-key algorithms include the Data Encryption Standard (DES), the Advanced Encryption Standard (AES), and the International Data Encryption Algorithm (IDEA). All of the aforementioned algorithms are hereby expressly incorporated by reference herein.

As discussed above, it is desirable to perform partial encryption on the data. By way of example only, in a 256 byte data packet (excluding header information), it may be desirable to encrypt 128 bytes of data. Preferably, at least half of the data is encrypted. The partial encryption can occur at set or random intervals within a data block or packet. For example, a set interval may encrypt every even or every odd bit in the data block or packet. The secure buffer 300 preferably keeps track of the amount and location of the partially encrypted data. This encryption information is preferably stored in the memory 310, either in look-up table format or some other format. Alternatively, the encryption information may be stored elsewhere, such as within the buffer 308 or even outside the secure buffer 300. The encryption information may also include an indicator as to the type of encryption employed. In an alternative, some or all of the encryption information may be stored along with the data itself in a shared memory, such as the memory 130.

In the above examples, the encrypted data can be sent from the secure buffer 300 to an external memory for storage. Preferably, the external memory is a shared memory. The encrypted data may be sent from the secure buffer 300 to the external memory via a common data bus, e.g., PE bus 120. The external memory may be the memory 130 which is accessible by multiple SPUs 108a-d, as well as by the PU 104 and the PE 100. The external memory may also be accessible by other PEs 100 that are physically and/or logically distinct from the PE 100, PU 104 or SPU 200 that contains the secure buffer 300. However, because the data is encrypted, and because the encryption information is stored within the secure buffer 300, other coprocessors or processing elements will be unable to use the data stored in the shared memory.

Figure 7:
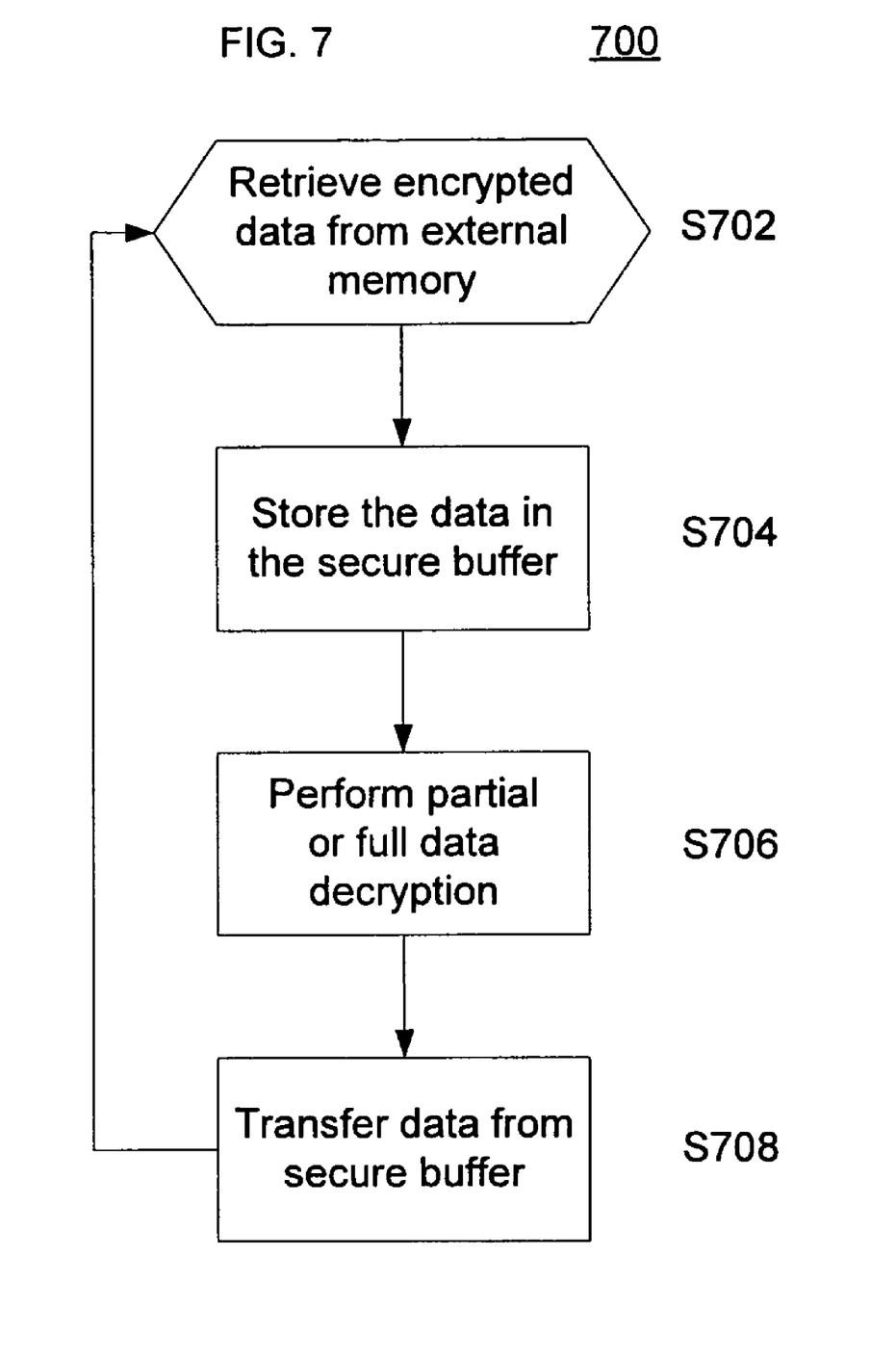
FIG. 7 is a flow diagram illustrating a method of decrypting data using a secure buffer in accordance with aspects of the present invention.

The encrypted data may be subsequently retrieved and decrypted, as seen in flow diagram 700 of FIG. 7. In step S702, encrypted data is retrieved from a memory (e.g., an external memory) by, for example, the memory connection 122, the memory interface 110 and the PE bus 120. Then, in step S704, the encrypted data is preferably stored in the buffer 308 of the secure buffer 300. Depending upon the encryption scheme, partial or full data decryption may be performed in step S706. The decryption may occur using the encryption processor 312 or the encryption processor 230, in accordance with the encryption information (if any) stored in the memory 310 of the secure buffer 300. The SPU 200 or other devices may then use the decrypted data. Once decrypted, the data may be transferred from the secure buffer 300 to another device within the SPU 200 or to another device, such as a different SPU, to the PU within the PE, to a different PE, etc.

Figure 8:
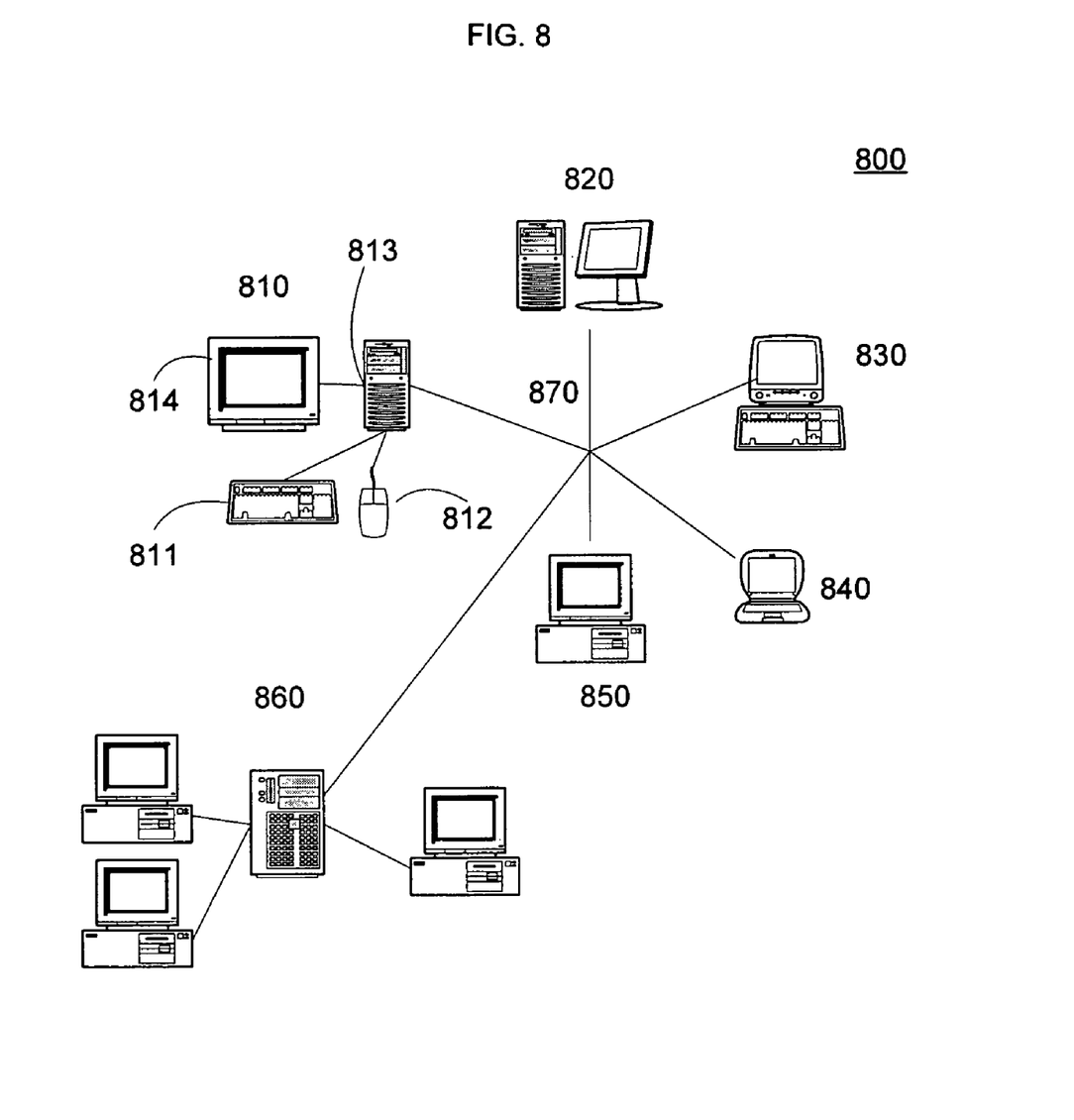
FIG. 8 illustrates a computing network in accordance with aspects of the present invention.

FIG. 8 is a schematic diagram of a computer network depicting various computing devices that can be used alone or in a networked configuration in accordance with the present invention. The computing devices may comprise computer-type devices employing various types of user inputs, displays, memories and processors such as found in typical PCs, laptops, servers, gaming consoles, PDAs, etc. For example, FIG. 8 illustrates a computer network 800 that has a plurality of computer processing systems 810, 820, 830, 840, 850 and 860, connected via a communications network 870 such as a LAN, WAN, the Internet, etc. and which can be wired, wireless, a combination, etc.

Each computer processing system can include, for example, one or more computing devices having user inputs such as a keyboard 811 and mouse 812 (and various other types of known input devices such as pen-inputs, joysticks, buttons, touch screens, etc.), a display interface 813 (such as connector, port, card, etc.) for connection to a display 814, which could include, for instance, a CRT, LCD, or plasma screen monitor, TV, projector, etc. Each computer also preferably includes the normal processing components found in such devices such as one or more memories and one or more processors located within the computer processing system. The memories and processors within such computing device are adapted to perform, for instance, processing of program modules using programming references in accordance with the various aspects of the present invention as described herein. The memories can include local and external memories for storing code functions and data groups in accordance with the present invention.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method of processing data, comprising:
receiving unencrypted data in a processor, the received unencrypted data comprising a packet having user data and header data;
performing encryption on the received unencrypted data to generate encrypted data, the encryption being partial data encryption performed at random intervals on the user data; and
storing the encrypted data and information pertaining to the partial data encryption in a secure buffer within the processor so that the encrypted data and information are not accessible by other processors on a same chip, the encrypted data being stored in short term memory within the secure buffer and the information being stored in a non-volatile memory of the secure buffer;
wherein the information either (1) comprises an amount and location of the partially encrypted user data, or (2) includes an indicator identifying a type of encryption employed.

2. The method of claim 1, further comprising:
removing the encrypted data from the secure buffer; and
transferring the encrypted data to an external memory.

3. The method of claim 2, wherein the external memory is accessible to a plurality of processors.

4. The method of claim 1, wherein, prior to performing the encryption, the received unencrypted data is stored in the secure buffer.

5. The method of claim 1, wherein the encryption is performed by an encryption processor within the secure buffer.

6. The method of claim 1, wherein the encryption is performed by an encryption processor external to the secure buffer.

7. A method of processing data, comprising:
receiving unencrypted data in a processor;
storing the received unencrypted data in a secure buffer within the processor so that the stored data is not accessible by other processors on a same chip, the received unencrypted data including header data and user data;
performing encryption on the stored received unencrypted data to generate encrypted data, the encryption being partial data encryption performed on the user data; and
storing encryption information including an amount and location of the partially encrypted user data, the encryption information being stored in a non-volatile memory within the secure buffer, the non-volatile memory being separate from a short-term memory within the secure buffer that stores the encrypted data.

8. The method of claim 7, further comprising transferring the encrypted data to an external memory.

9. The method of claim 8, wherein the external memory is accessible to a plurality of processors.

10. The method of claim 7, wherein the encryption is performed by an encryption processor within the secure buffer.

11. The method of claim 7, wherein the encryption is performed by an encryption processor external to the secure buffer.

12. A method of processing data, comprising:
retrieving encrypted data from an external memory, the encrypted data being partially encrypted data, the partial encryption having been performed at random intervals on the encrypted data to obtain the partially encrypted data;
storing the partially encrypted data and information pertaining to the partially encrypted data in short-term memory of a secure buffer within a processor so that the stored partially encrypted data and information are not accessible to other processors on a same chip, wherein the information either (1) comprises an amount and location of the partially encrypted data, or (2) includes an indicator identifying a type of encryption employed; and
performing decryption on the partially encrypted data to generate decrypted data by:
retrieving encryption information pertaining to the partially encrypted data from a non-volatile memory within the secure buffer, the non-volatile memory being separate from the short-term memory, and
applying the encryption information to decrypt the partially encrypted data.

13. The method of claim 12, further comprising transferring the decrypted data from the secure buffer to a device external to the processor.

14. The method of claim 12, further comprising transferring the decrypted data from the secure buffer to another device within the processor.

15. The method of claim 12, wherein the decryption is performed by a decryption processor within the secure buffer.

16. The method of claim 12, wherein the decryption is performed by a decryption processor external to the secure buffer.

17. A processing apparatus, comprising:
a local memory for storing data;
a plurality of registers associated with the local memory;
at least one floating point unit linked with the plurality of registers, the floating point unit being operable to perform floating point operations on the data;
at least one integer unit linked with the plurality of registers, the integer unit being operable to perform integer operations on the data;
a bus interface operatively connected to the local memory;
an encryption processor for performing encryption and decryption processing on selected data; and
a secure buffer for storing the selected data, the secure buffer being logically connected to the encryption processor and the bus interface, wherein the stored selected data is not accessible to other processing apparatuses on a same chip;
wherein the selected data includes a packet having user data and header data, and wherein the encryption processor is configured to perform partial encryption at random intervals on the user data but no encryption on the header data; and
wherein the secure buffer further stores encryption information pertaining to the partial encryption of the user data in the secure buffer, the encryption information being stored in a non-volatile memory of the secure buffer, and the selected data being stored in short term memory within the secure buffer.

18. The processing apparatus of claim 17, wherein the encryption processor is internal to the secure buffer.

19. The processing apparatus of claim 17, wherein the encryption processor is external to the secure buffer.

20. The processing apparatus of claim 17, wherein the secure buffer further comprises:
a controller for processing the selected data within the secure buffer, wherein the controller manages operation of the short term memory and the non-volatile memory.

21. The processing apparatus of claim 20, wherein the secure buffer further comprises a buffer interface for passing the selected data to and from the secure buffer.

22. A method of processing data in a parallel processing system, the method comprising:
providing a plurality of processors, at least some of the plurality of processors including a secure buffer;
receiving unencrypted data in a selected one of the plurality of processors, the unencrypted data including header data and user data;
performing partial encryption on the user data but not the header data to generate encrypted data, the partial encryption being performed at random intervals on the user data;
storing the encrypted data and information pertaining to the partial encryption in a short-term memory within the secure buffer of the selected processor so that the stored encrypted data and information is not accessible by other ones of the plurality of processors on a same chip; and
storing encryption information pertaining to the partial encryption in non-volatile memory within the secure buffer of the selected processor, the non-volatile memory being distinct from the short-term memory;
wherein the information either (1) comprises an amount and location of the partial encryption, or (2) includes an indicator identifying a type of encryption employed.

23. The method of claim 22, further comprising:
removing the encrypted data from the secure buffer of the selected processor; and
transferring the encrypted data to an external memory.

24. The method of claim 23, wherein the external memory is accessible to the plurality of processors.

25. The method of claim 23, wherein, prior to transferring the encrypted data, the method further comprises placing the encrypted data onto a common data bus shared by at least some of the plurality of processors.

26. The method of claim 22, wherein the plurality of processors are configured to operate in parallel.

27. The method of claim 22, wherein, prior to performing the encryption, the received unencrypted data is stored in the secure buffer of the selected processor.

28. A method of processing data in a parallel processing system, the method comprising:
providing a plurality of processors, at least some of the plurality of processors including a secure buffer;
receiving unencrypted data in a selected one of the plurality of processors;
storing the received unencrypted data in the secure buffer of the selected processor so that the stored received data is not accessible by other ones of the plurality of processors on a same chip;
performing partial data encryption on a user portion of the data at random intervals to generate encrypted data; and
storing information pertaining to the partial data encryption in the secure buffer of the selected processor, the information being stored in a non-volatile memory of the secure buffer, and the partially encrypted data being stored in short term memory within the secure buffer;
wherein the information either (1) comprises an amount and location of the partially encrypted data, or (2) includes an indicator identifying a type of encryption employed.

29. The method of claim 28, further comprising transferring the encrypted data to an external memory.

30. The method of claim 29, wherein, prior to transferring the encrypted data, the method further comprises placing the encrypted data onto a common data bus shared by at least some of the plurality of processors.

31. The method of claim 29, wherein the external memory is accessible to the plurality of processors.

32. The method of claim 28, wherein the plurality of processors are configured to operate in parallel.

33. A processing apparatus, comprising:
a processing unit;
a plurality of sub-processing units, at least a selected one of the plurality of sub-processing units including a secure buffer for storing encrypted data, the stored encrypted data being partially encrypted data inaccessible to other ones of the plurality of sub-processing units on a same chip, such partial encryption having been performed at random intervals on unencrypted data; and
a direct memory access controller connected to the processing unit and the plurality of sub-processing units;
wherein the direct memory access controller is operable to transfer the encrypted data stored in the secure buffer of the selected sub-processing unit to an external memory; and
wherein the secure buffer further comprises:
a buffer for temporarily storing the partially encrypted data;
a non-volatile memory for storing encryption information associated with the partially encrypted data, the encryption information either (1) comprises an amount and location of the partially encrypted data, or (2) includes an indicator identifying a type of encryption employed; and
a controller for processing the partially encrypted data within the secure buffer, wherein the controller manages operation of the buffer and the memory.

34. The processing apparatus of claim 33, wherein, prior to the direct memory access controller transferring the encrypted data to the external memory, the encrypted data is placed on a data bus shared by at least some of the sub-processing units.

35. The processing apparatus of claim 33, wherein the selected sub-processing unit further includes an encryption processor operable to generate the encrypted data and to generate decrypted data from the encrypted data.

36. The method of claim 1, wherein performing the encryption includes encrypting at least half of the user data but not encrypting any header data.

37. The processing apparatus of claim 17, wherein the partial encryption at random intervals is done on at least half of the user data.

38. The method of claim 7, wherein performing the encryption includes encrypting either every even bit or every odd bit in a data packet of the received unencrypted data without encrypting any header data in the data packet.

* * * * *